United States Patent
Keller et al.

(10) Patent No.: US 11,119,668 B1
(45) Date of Patent: Sep. 14, 2021

(54) MANAGING INCOMPRESSIBLE DATA IN A COMPRESSION-ENABLED LOG-STRUCTURED ARRAY STORAGE SYSTEM

(71) Applicant: EMC IP Holding Company LLC, Hopkinton, MA (US)

(72) Inventors: Itay Keller, Tel Aviv (IL); Nir Milstein, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/823,813

(22) Filed: Mar. 19, 2020

(51) Int. Cl.
*G06F 3/06* (2006.01)

(52) U.S. Cl.
CPC ............ *G06F 3/0631* (2013.01); *G06F 3/061* (2013.01); *G06F 3/064* (2013.01); *G06F 3/067* (2013.01); *G06F 3/0608* (2013.01); *G06F 3/0619* (2013.01); *G06F 3/0653* (2013.01); *G06F 3/0665* (2013.01)

(58) Field of Classification Search
CPC .... G06F 3/0631; G06F 3/0653; G06F 3/0665; G06F 3/061; G06F 3/0608; G06F 3/0619; G06F 3/064; G06F 3/067
See application file for complete search history.

(56) References Cited

U.S. PATENT DOCUMENTS

| | | | |
|---|---|---|---|
| 5,551,003 A | 8/1996 | Mattson et al. | |
| 5,764,880 A | 6/1998 | Gerdt et al. | |
| 6,052,799 A | 4/2000 | Li et al. | |
| 6,941,420 B2 | 9/2005 | Butterworth et al. | |
| 9,223,843 B1 * | 12/2015 | Madhavarapu | G06F 16/273 |
| 9,372,751 B2 | 6/2016 | McNutt | |
| 9,514,014 B2 | 12/2016 | Webman et al. | |

(Continued)

FOREIGN PATENT DOCUMENTS

WO PCT/US2019/024885 1/2020
WO PCT/US2019/024900 1/2020

OTHER PUBLICATIONS

Dell EMC, "Dell EMC VxRack FLEX," Dell EMC Product Overview, 2018, 5 pages.

(Continued)

*Primary Examiner* — Hiep T Nguyen
(74) *Attorney, Agent, or Firm* — Ryan, Mason & Lewis, LLP

(57) ABSTRACT

Techniques are provided for managing incompressible data in a compression-enabled log-structured array storage system. A log-structured array is implemented in a block storage device having a physical storage space divided into logical data blocks (e.g., fixed-size allocation units), wherein the log-structured array includes a log segment which includes a set of contiguous logical data blocks of the physical storage space. When a write request is received to store data, if the received data is deemed compressible, the data is compressed and written in a log entry in the log segment of the log-structured array. If the data is deemed incompressible, the data is written without compression in a log entry in the log segment of the log-structured array such that the log entry which stores the data without compression is write-aligned to at least one logical data block of the set of contiguous logical data blocks of the log segment.

20 Claims, 6 Drawing Sheets

(56) References Cited

U.S. PATENT DOCUMENTS

| | | | |
|---|---|---|---|
| 10,445,180 | B2 | 10/2019 | Butterworth et al. |
| 10,747,452 | B1* | 8/2020 | Sasson ................ G06F 3/0611 |
| 2002/0032835 | A1 | 3/2002 | Li et al. |
| 2012/0166752 | A1* | 6/2012 | Taniyama ............. G06F 3/064 711/170 |
| 2016/0306561 | A1* | 10/2016 | Huang ................ G06F 3/0688 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0133583 | A1* | 4/2020 | Xiao ................ H03M 7/3071 |
| 2020/0133858 | A1* | 4/2020 | Zhang ............... G06F 12/0802 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 12 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

* cited by examiner

200

300

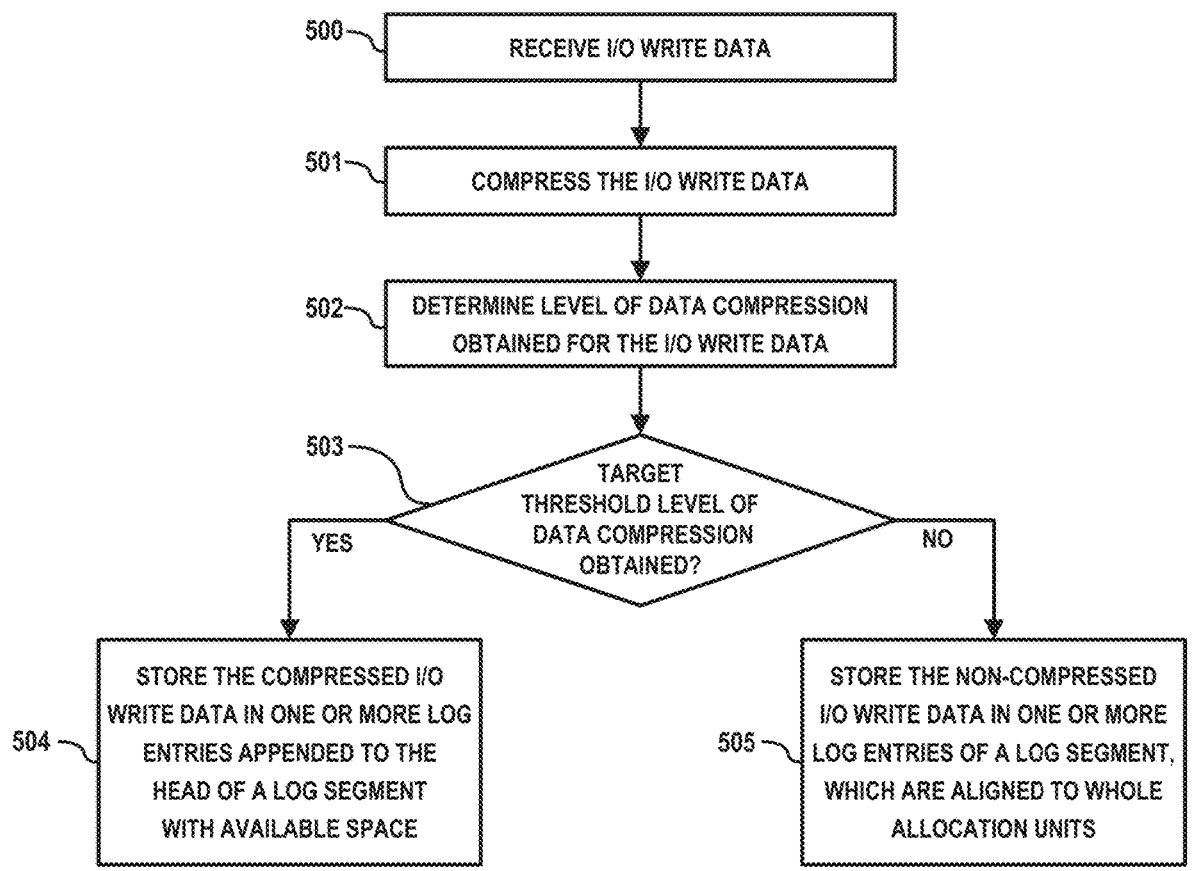
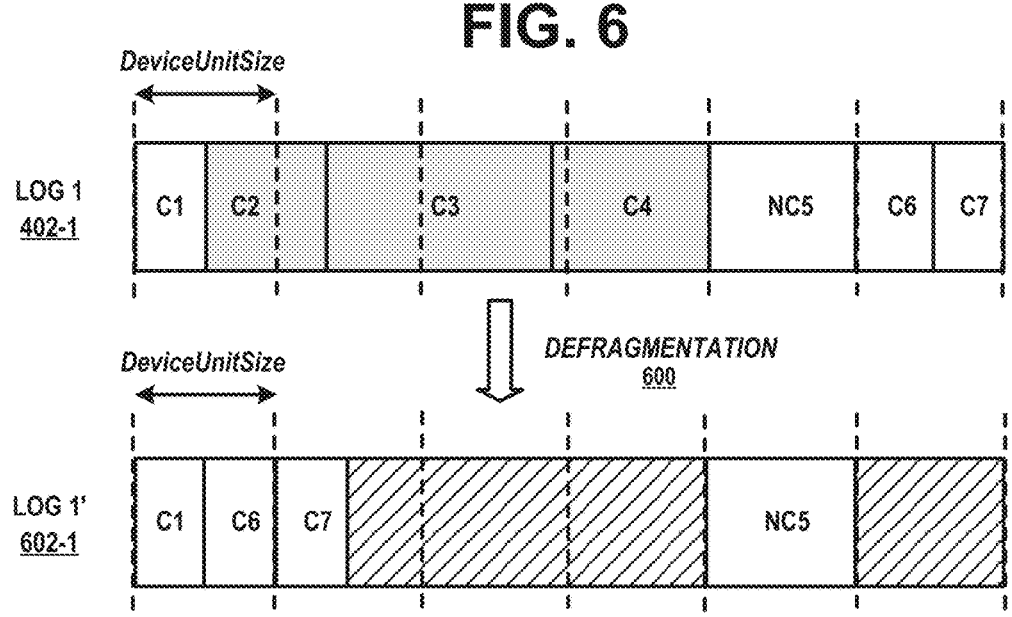

MANAGING INCOMPRESSIBLE DATA IN A COMPRESSION-ENABLED LOG-STRUCTURED ARRAY STORAGE SYSTEM

FIELD

This disclosure relates generally to data storage management techniques and, more specifically, to techniques for managing a log-structured data storage system.

BACKGROUND

State-of-the-art data storage systems are designed with the goal of enhancing storage efficiency and performance. For example, in some data storage systems, storage efficiency is enhanced by implementing in-line data compression to compress ingress data and store the compressed data to disk, thereby increasing disk storage utilization. While compression-enabled storage systems enhance storage utilization, there are problems associated with implementing in-line data compression in storage systems which are configured to perform "in-place-updates" of stored data where modified data is rewritten to the same storage location as the previous version. Such problems stem from the fact that the amount of compression achieved for a given block of data is dependent on the content of the data and, consequently, data compression generates compressed data of variable sizes. In this regard, when a certain piece of data is updated and rewritten to the same storage location, there is no guarantee that the compressed updated data will be able to fit in the same location on disk that was allocated to the older compressed data before the update. In other instances, the compressed updated data may be smaller in size than the older compressed data, leaving a "gap" in the storage space allocated to the data.

To address these issues, many compression-enabled storage systems implement a log-structured array (LSA) storage layout for storing compressed data. In an LSA layout, the disk storage space is divided into equal-sized blocks, referred to as "logs" or "log segments," into which compressed data is written. In an LSA storage system, whenever a user-offset is written, the data is written in a log entry in a log segment that has enough vacancy to host the data, wherein new data is placed in a new log entry that follows any pre-existing log entry in the log segment. The LSA storage system accommodates the size-change variability of compressed data since data is not allocated to a fixed storage location. Instead, when compressed data in an existing log entry is updated, an "out-of-place update" is performed to rewrite the updated compressed data into a new log entry, and the older existing data is invalidated. Due to the continued creation of invalid log entries over time, the LSA layout requires maintenance defragmentation cycles to close "gaps" in the storage space which result from the invalid entries. In conventional LSA storage systems, however, the out-of-place updates and defragmentation cycles of log segments can unduly increase input/output (I/O) amplification (e.g., read amplification and write amplification) in a way that can adversely impact storage performance and lead to decreased endurance of the storage media.

SUMMARY

Exemplary embodiments of the disclosure generally include techniques for managing incompressible data in a compression-enabled log-structured array storage system. For example, an exemplary embodiment includes a process that is implemented by a storage control system (e.g., a software-defined storage system). The storage control system implements a log-structured array in at least one block storage device, wherein the at least one block storage device comprises a physical storage space divided into a plurality of logical data blocks, wherein the logical data blocks each comprise a separately addressable unit of the physical storage space with a specified block size, and wherein the log-structured array comprises at least one log segment which comprises a set of contiguous logical data blocks of the physical storage space of the at least one block storage device. The storage control system receives an I/O write request and associated I/O write data to be written to the at least one block storage device. The storage control system compresses the I/O write data to generate compressed I/O write data, determines a level of data compression of the compressed I/O write data, and determines whether the level of data compression of the compressed I/O write data meets a target threshold level of data compression. In response to determining that the level of data compression of the compressed I/O write data does meet the target threshold level of data compression, the storage control system writes the compressed I/O write data in a log entry in the at least one log segment of the log-structured array. In response to determining that the level of data compression of the compressed I/O write data does not meet the target threshold level of data compression, the storage control system writes the I/O write data without compression in a log entry in the at least one log segment of the log-structured array such that the log entry which comprises the I/O write data without compression is write-aligned to at least one logical data block of the set of contiguous logical data blocks of the at least one log segment.

Other embodiments of the disclosure include, without limitation, server nodes, and articles of manufacture comprising processor-readable storage media for managing incompressible data in a compression-enabled log-structured array storage system.

BRIEF DESCRIPTION OF THE DRAWINGS

FIG. 5 is a flow diagram of a method of writing data to a log-structured array according to an exemplary embodiment of the disclosure.

FIG. 6 schematically illustrates a process for defragmenting a log segment of a log-structured array according to an exemplary embodiment of the disclosure.

DETAILED DESCRIPTION

Exemplary embodiments will be described herein with reference to exemplary information processing systems which implement compression-enabled storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
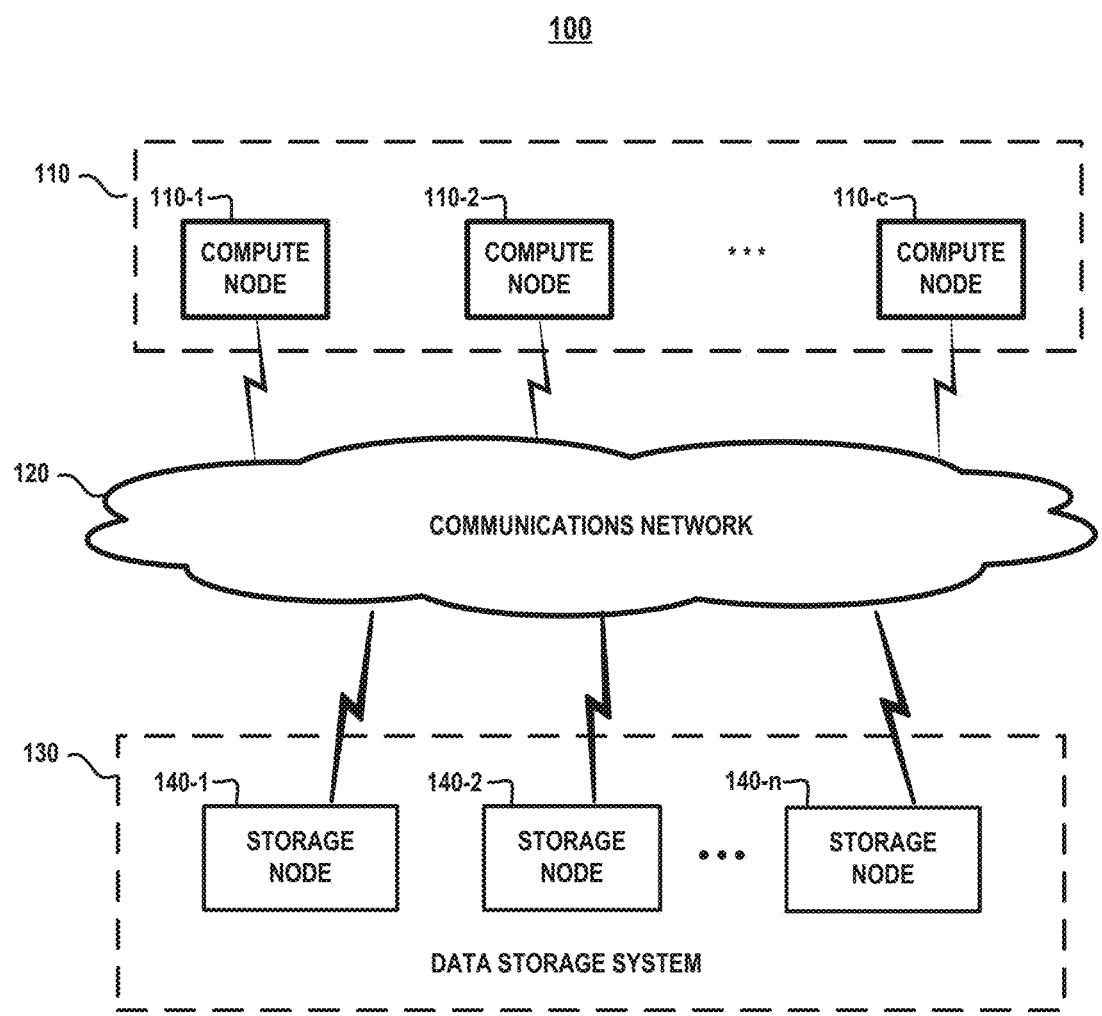
FIGS. 1A and 1B schematically illustrate an information processing system comprising a compression-enabled storage system according to an exemplary embodiment of the disclosure.
Figure 1B:
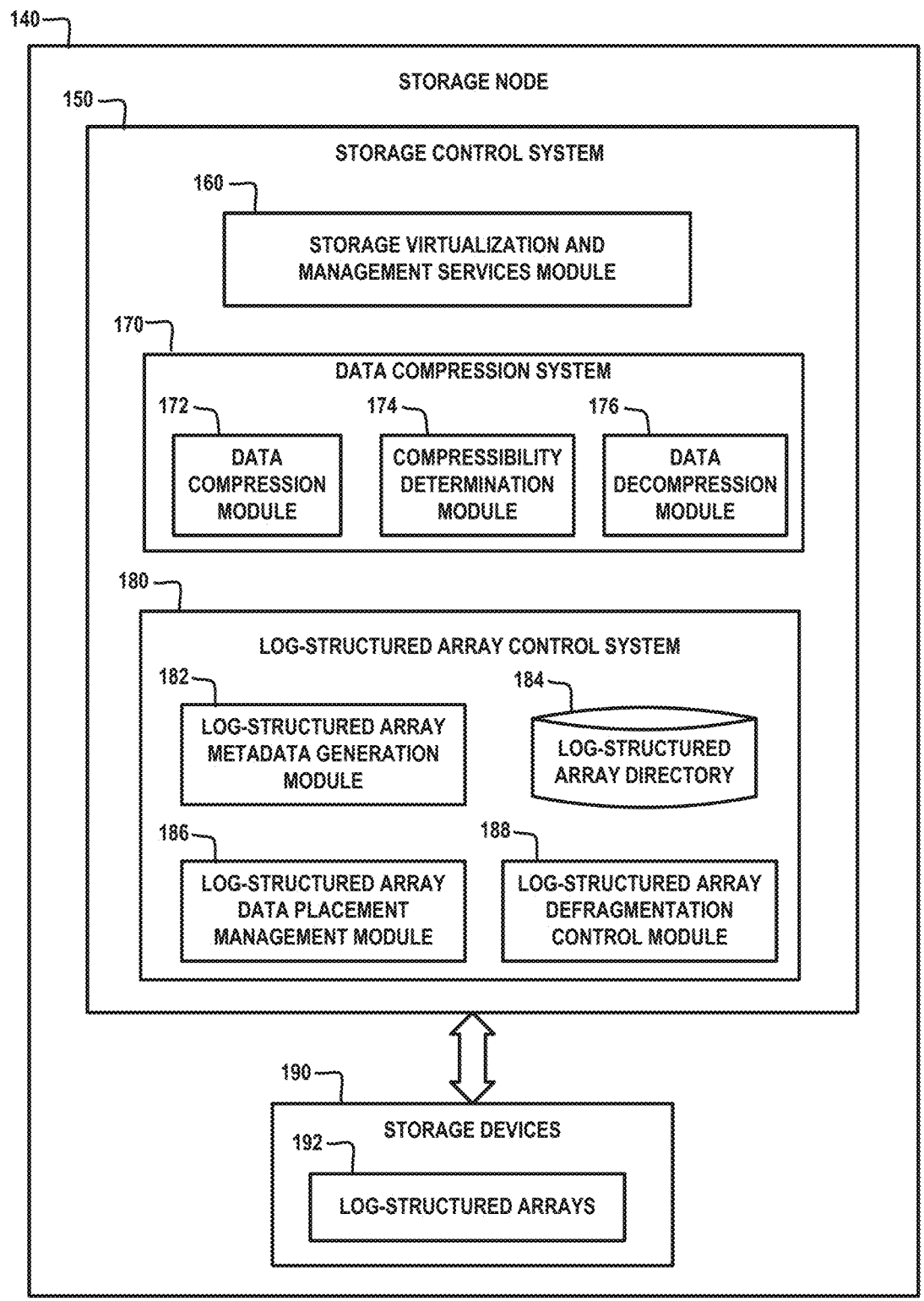

FIGS. 1A and 1B schematically illustrate an information processing system comprising a compression-enabled storage system according to an exemplary embodiment of the disclosure. More specifically, FIG. 1A schematically illustrates an information processing system 100 which comprises a plurality of compute nodes 110-1, 110-2, . . . , 110-c (collectively referred to as compute nodes 110), a communications network 120, and a data storage system 130. The data storage system 130 comprises a plurality of storage nodes 140-1, 140-2, . . . , 140-n (collectively referred to as storage nodes 140, or each singularly referred to as storage node 140). In the context of the exemplary embodiments described herein, the data storage system 130 comprises a compression-enabled data storage system which supports in-line compression of data that is stored in the storage media that is accessed and controlled by the storage nodes 140. FIG. 1B schematically illustrates an exemplary framework of at least one or more of the storage nodes 140.

In particular, as shown in FIG. 1B, the storage node 140 comprises a storage control system 150 and a plurality of storage devices 190 having storage capacity that is organized into a plurality of log-structured arrays 192. In general, the storage control system 150 implements data storage and management methods that are configured to, e.g., (i) divide the storage capacity of the storage devices 190 into storage pools and logical volumes, (ii) organize the storage capacity of one or more of the storage pools/volumes into an LSA storage architecture which comprises the plurality of log-structured arrays 192, and (iii) store compressed data and non-compressed data in predefined data block sizes (referred to as allocation unit size) in log segments of the log-structured arrays 192 according to an LSA data placement scheme.

To implement such functionalities, the storage control system 150 comprises a storage virtualization and management services module 160, a data compression system 170, and a log-structured array control system 180 (referred to hereafter as LSA control system 180). The data compression system 170 comprises a data compression module 172, a data compressibility determination module 174, and a data decompression module 176, the functions of which will be explained in further detail below. The LSA control system 180 comprises a log-structured array metadata generation module 182, a log-structured array directory 184, a log-structured array data placement management module 186, and a log-structured array defragmentation control module 188, the functions of which will be explained in further detail below. It is to be noted that the storage control system 150 may include additional modules and other components typically found in conventional implementations of storage controllers and storage systems, although such additional modules and other components are omitted for clarity and simplicity of illustration.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as executing of one or more applications on behalf of each of one or more users associated with respective ones of the compute nodes. Such applications illustratively issue input-output ROOM I/O requests that are processed by a corresponding one of the storage nodes 140. The term "input-output" as used herein refers to at least one of input and output. For example, I/O requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes (e.g., server node 700, shown in FIG. 7) having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 190 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 190 may be implemented in the storage node 140. In this regard, the term "storage device" as used herein is intended to be broadly construed, so as to encompass, for example, SSDs, HDDs, flash drives, hybrid drives or other types of storage media. The data storage devices 190 are connected to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 190 and control I/O access to the storage devices 190 and/or other storage resources (e.g., DAS or NAS resources) that are directly attached or network-connected to the storage node 140. In some embodiments, the storage control system 150 is a component (e.g., storage data server) of a software-defined storage (SDS) system which supports the virtualization of the storage devices 190 by separating the control and management software from the hardware architecture. More specifically, in a software-defined storage environment, the storage control system 150 comprises an SDS storage data server that is configured to abstract storage access services from the underlying storage hardware to thereby control and manage I/O requests issued by the compute nodes 110, as well as support networking and connectivity. In this instance, the storage control system 150 comprises a software layer that is hosted by the storage node 140 and deployed in the data path between the compute nodes 110 and the storage devices 190 of the storage node 140, and is configured to respond to data I/O requests from the compute nodes 110 by accessing the storage devices 190 to store/retrieve data to/from the storage devices 190 based on the I/O requests.

In a software-defined storage environment, the storage control system 150 is configured to provision, orchestrate and manage the local storage resources (e.g., the storage devices 190) of the storage node 140. For example, the storage control system 150 implements methods that are configured to create and manage storage pools (e.g., virtual pools of block storage) by aggregating capacity from the storage devices 190. The storage control system 150 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage control system 150 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage server node 140 is part of a loosely coupled server cluster which enables "scale-out" of the software-defined storage environment, wherein each instance of the storage control system 150 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage control systems 150 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage control systems 150. In particular, the SDCs run on the same servers as the compute nodes 110 which require access to the block devices that are exposed and managed by the storage control systems 150 of the storage nodes 140. The SDC exposes block devices representing the virtual storage volumes that are currently mapped to that host. In particular, the SDC serves as a block driver for a client (server), wherein the SDC intercepts I/O requests, and utilizes the intercepted I/O request to access the block storage that is managed by the storage control systems 150. The SDC provides the operating system or hypervisor (which runs the SDC) access to the logical block devices (e.g., volumes).

The SDCs have knowledge of which SDS control systems (e.g., storage control system 150) hold its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant SDS resource usage. Each SDC maintains peer-to-peer connections to every SDS storage control system 150 that manages the storage pool. A given SDC can communicate over multiple pathways to all of the storage nodes 140 which store data that is associated with a given I/O request. This multi-point peer-to-peer fashion allows the SDS to read and write data to and from all points simultaneously, eliminating bottlenecks and quickly routing around failed paths.

The SDS metadata manager components are deployed on multiple server nodes and operate in a manner which forms a tightly coupled cluster that is configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that is required for system operation of the SDS environment such as configuration changes, managing the SDS data clients and data servers, device mapping, values, snapshots, system capacity including device allocations and/or release of capacity, RAID protection, errors and failures, and system rebuild tasks including rebalancing.

Regardless of the specific implementation of the storage environment, as noted above, the various modules of the storage control system 150 of FIG. 1B collectively provide data storage and management methods that are configured to, e.g., (i) divide the storage capacity of the storage devices 190 into storage pools and logical volumes, (ii) organize the storage capacity of the storage pools/volumes pools into the plurality of log-structured arrays 192, and (iii) store compressed data and non-compressed data in log segments of the log-structured arrays 192. In particular, the storage virtualization and management services module 160 implements any suitable logical volume management (LVM) system which is configured to create and manage local storage volumes by aggregating the storage devices 190 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 160 implements methods to support various data storage management services such as data protection, data migration, data deduplication, replication, thin provisioning, snapshots, data backups, etc.

The data compression system 170 is configured to support in-line compression of data that is written to the LSA storage, and in-line decompression of compressed data that is read from the LSA storage. In particular, the data compression module 172 implements one or more types of data compression techniques to compress I/O write data that is provided with an I/O write request. For a write I/O operation, the associated I/O write data is divided into blocks, and each block is separately compressed by the data compression module 172. In some embodiments, the compressed data blocks can be grouped into blocks with block sizes that are less than or equal to an "allocation unit size" before being written to the LSA storage. The data compression module 172 can implement one more data compression techniques including, but not limited to, Lempel-Ziv (LZ) compression, Lempel-Ziv-Welch (LZW) compression, other variants of LZ compression, Huffman encoding, run-length encoding, etc., and other types of data compression techniques which are suitable for the expected types of data that are to be stored for a given application.

The data decompression module 176 is configured to decompress compressed data that is read from the LSA storage in response to I/O read requests. In particular, when compressed data is accessed from the LSA storage, the compressed data is input to the data decompression module 176 and decompressed using a decompression process which corresponds to the process that was used to compress the data. The decompressed data is then returned in response to the I/O read request.

The compressibility determination module 174 is configured to determine the "compressibility" of data that is to be written to the LSA storage. With regard to a given block of I/O write data, the term "compressibility" as used herein broadly refers to (i) a level of data compression that can be obtained for the given block of I/O write data or (ii) a degree to which a size of the given block of I/O write data can be reduced by data compression. The data placement techniques implemented by the LSA storage control system 180 are based, in part, on the understanding that not all data is compressible. For example, when data compression is performed on data that is essentially incompressible, the size of the resulting "compressed" data may be the same or greater than the size of the original, non-compressed data. For example, incompressible data can include pre-compressed content (e.g. compressed audio and video), or pure random data.

The compressibility of I/O write data can be determined in various ways. For example, in some embodiments, any compression product that yields a size which is greater than some predefined size threshold T is deemed, in effect, to be incompressible:

$$IsCompressible(\text{data}) = \begin{cases} \text{TRUE}, & \text{size(compress(data))} \leq T \\ \text{FALSE}, & \text{otherwise} \end{cases}$$

In other embodiments, the compressibility of I/O write data can be determined by (i) computing a "compressibility value" as a function of a size of the I/O write data and a size of the compressed I/O write data, and (ii) comparing the computed "compressibility value" to a predefined "compressibility threshold value" to determine whether a level of data compression of the compressed I/O write data meets or exceeds a target minimum level of data compression. For example, in some embodiments, a compressibility value of I/O write data can be expressed in terms of a compression ratio R value, which is computed as a ratio of the size of the original (non-compressed) I/O write data to the size of the compressed I/O write data, as follows:

$$CompressionRatio(\text{data}): R = \frac{\text{size(data)}}{\text{size(compress(data))}}$$

For example, a data compression process which compresses data from a size of 20 Kilobytes (KB) to a size of 4 KB yields a compression ratio R of 20/4=5, or a ratio of 5:1. In this instance, any compression product that yields a compression ratio R which is greater than or equal to a predefined compression ratio threshold $R_{Threshold}$ can be deemed compressible, while any compression product that yields a compression ratio R which is less than the predefined compression ratio threshold $R_{Threshold}$ is deemed, in effect, to be incompressible. In some embodiments, the compression ratio threshold $R_{Threshold}=1.25$. In this embodiment, the compression ratio threshold $R_{Threshold}$ is an exemplary "compressibility threshold value."

In other embodiments, the compressibility of I/O write data can be determined based on a computation of a compressibility value C, where $$C = 1/R = \frac{size(compress(data))}{size(data)}.$$

For example, assuming the data compression process results in the reduction of the size of data from 20 KB to 4 KB, the computation of the compressibility value $C=4/20$, yields of value of 0.2. The compressibility value C can be compared to a predefined compressibility threshold value $C_{Threshold}$ to determine if a given block of data is deemed compressible or incompressible. For example, in some embodiments, an exemplary compressibility threshold value is set to $C_{Threshold}=0.8$ (which corresponds to a compression ratio $R=1.25$). In this instance, any compression product that yields a compressibility value C which is less than or equal to $C_{Threshold}$ is deemed compressible, while any compression product that yields a compressibility value C which is greater than $C_{Threshold}$ is deemed, in effect, to be incompressible.

In other embodiments, a "compressibility value" for I/O write data can be expressed in terms of a space savings value S, which represents a reduction in the size of the compressed I/O write data relative to the non-compressed size of the I/O write data. In particular, the space savings value S is computed as follows:

$$SpaceSavings(data): S = 1 - \left(\frac{size(compress(data))}{size(data)}\right)$$

For example, assuming a data compression process results in the reduction in the size of I/O write data from 20 KB to 4 KB, the computation of $S=1-(4/20)$ yields a space savings value S of 0.8 (or 80%). The space savings value S can be compared to a predefined space savings threshold value $S_{Threshold}$ to determine if a given block of data is deemed compressible or incompressible. For example, in some embodiments, an exemplary space savings threshold value is set to $S_{Threshold}=0.2$ (which corresponds to $C_{Threshold}=0.8$ or $R_{Threshold}=1.25$). The value of $S_{Threshold}=0.2$ corresponds to at least a 20% reduction in the size of the compressed I/O write data relative to the non-compressed size of the I/O write data. In this instance, any compression product that yields a space savings value S which is greater than or equal to $S_{Threshold}$ is deemed compressible, while any compression product that yields a space savings value S which is less than $S_{Threshold}$ is deemed, in effect, to be incompressible. In this embodiment, the space savings threshold value $S_{Threshold}$ is an exemplary "compressibility threshold value."

Figure 2:
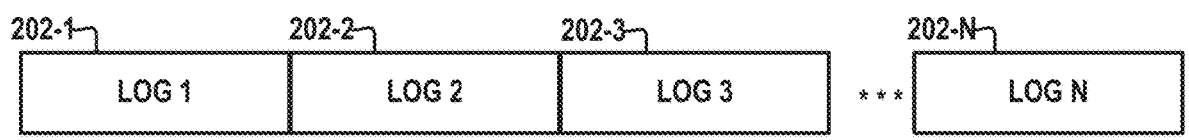
FIG. 2 schematically illustrates a log-structured array which can be created and utilized by a log-structured array control system to store compressed and uncompressed data, according to an exemplary embodiment of the disclosure.

In general, the LSA control system 180 creates and manages the log-structured arrays 192 within the storage pools/volumes of the storage devices 190. For example, FIG. 2 illustrates a log-structured array 200 which can be created and utilized by the LSA control system 180 to store compressed and uncompressed data. The log-structured array 200 comprises an array of N log segments 202-1, 202-2, 202-3, . . . , 202-N (collectively, or individually referred to as log segments 202, or logs 202). In some embodiments, the log-structured array 200 is implemented in one or more block storage devices, wherein each block storage device comprises a physical storage space divided into a plurality of logical data blocks (e.g., fixed-size allocation units), wherein the logical data blocks each comprise a separately addressable unit of the physical storage space with a specified block size (e.g., allocation unit size). Each logical data block (e.g., allocation unit) comprises a same number of one or more physical data blocks of the underlying storage media.

In the LSA layout, each log segment 202 of the log-structured array 200 comprises a set of contiguous logical data blocks of the physical storage space. The log segments 202 can reside in the same block device or be distributed over multiple block devices, depending on the configuration of the block storage devices. In some embodiments, the log segments 202 are equal in size (e.g., the log segments 202 each include the same number of logical data blocks). For example, assuming that each logical block (e.g., cluster of sectors on HDD, or page of SSD) is 4 KB, and that each log segment 202 has a segment size of 256 KB, then each of the N log segments 202 comprises a consecutive sequence of 64 logical data blocks within the LSA storage space.

Whenever a user-offset is written to a logical block address, the data is placed in a given log segment 202 which has enough vacancy to host the data. For example, when new data is written to LSA storage, the new data is appended to the end of a given log segment 202 which has sufficient room. In addition, metadata updates comprising log indexing information and other types of metadata are also appended to the given log segment 202 when data is written to the given log segment 202. In this regard, each log segment 202 will include a sequence of appended data entries comprising blocks of data and blocks of indexing metadata. Furthermore, when a modified data block comprising non-compressed data is re-written to LSA storage, the modified data block is written to the same log entry location(s) as the original data (referred to as "in-place update"). On the other hand, when a modified data block comprising compressed data is rewritten to the LSA storage, the modified data is written to one or more new log entry locations in a log segment which has vacancy (referred to as "out-of-place update"), wherein an out-of-place update invalidates the original compressed data that is held in one or more existing log entries.

The log-structured array metadata generation module 182 (hereafter referred to as LSA metadata generation module 182) is configured to generate log metadata that is included in metadata log entries that are appended to data entries in the log segments of the log-structured arrays 192. The log metadata entries comprise indexing information (e.g., pointers) that is included within the log segment to provide fast random access to data entries within the log segments, as well as information that describes the data entries (e.g., valid, not valid, compressed, uncompressed, etc.) within the log segment, and other information such as checksums for error detection, etc. The type of information and data structures that are used to implement the log metadata will vary depending on the application. For example, in some embodiments, the log metadata can be implemented using hash table data structures or B-tree data structures, or other suitable data structures for organizing the log indexing information.

The log-structured array directory 184 (hereafter referred to as LSA directory 184) stores mapping information which maps logical block addresses to physical block addresses of log entries within the log-structured arrays 192. In some embodiments, the LSA directory 184 is maintained in non-volatile system memory. In some embodiments, the logical block addresses of logical devices are mapped to physical data entries in the log-structured array 192. The LSA directory 184 provides information that maps each logical block address to a current block location in the log-structured arrays 192. For example, an entry in the LSA directory 184 for a given logical bock provides the physical ID and location of the log segment which stores the logical block, the starting location in the log segment (offset) and length in physical device units (e.g., sectors) to which the logical block is mapped. The LSA directory 184 can be implemented using any suitable type of directory data structure and directory implementation algorithm. For example, in some embodiments, the LSA directory 184 can implement a hash table which comprises key-value pairs, as is known in the art. In some embodiments, the directory information within the LSA directory 184 is used to determine the location of a given log segment that holds the data of a given logical block, while the metadata indexing entries within the given log segment are utilized to determine the location of the corresponding data within the log segment.

The log-structured array data placement management module 186 (hereafter, referred to as LSA data placement management module 186) implements methods for storing both compressed and non-compressed data entries within log segments of the log-structured arrays 192 in a way that minimizes I/O amplification (e.g., read amplification and write amplification) and enhances overall data access and management efficiency. The term "I/O amplification" refers to a broad set of circumstances in which an I/O request triggers multiple, undesirable I/O operations (e.g., the file system needs to perform multiple I/O operations to successfully service the initial I/O request). For example, a "read-modify-write" is one type of write operation that leads to I/O amplification because such write operation requires performing a read operation to read an entire logical data block (allocation unit) of existing data, modifying a portion of the data within the logical data block, and then rewriting the entire logical data block with the modified data back to disk. The "read-modify-write" process increases both read and write amplification due to the need to read extra data that is not the target of the I/O write request, and then rewrite such extra (unmodified) data along with the modified data back to disk.

The LSA data placement management module 186 minimizes I/O amplification in various ways. For example, as explained in further detail below, when I/O write data to be written to the LSA storage is deemed "incompressible," the data is written without compression to one or more log entries of a given log segment, wherein the log entries that include original, uncompressed data are write-aligned to whole allocation units. When the same data is subsequently modified, the LSA data placement management module 186 will perform an in-place update to write the updated data to the same log entries (i.e., same physical location). Such in-place updates of non-compressed data do not result in the generation of invalid log entries that result in fragmentation of log segments and which need to be reclaimed during defragmentation cycles for reuse of the storage space of the log segment.

The log-structured array defragmentation control module 188 (hereafter referred to as LSA defragmentation control module 188) implements methods for defragmenting log segments within the log-structured arrays 192. The physical location of data within log segments of the log-structured arrays 192 will change over time as a result of out-of-place writes that are performed by the LSA data placement management module 186 when writing modified blocks of compressed data to new log entries that are appended to the end of a given log segment. The out-of-place writes result in invalid blocks of data which cannot be reused until they are reclaimed. In addition, due to the runtime variation of data compressibility, some or all data entries that contain compressed data can have unused storage space that remains after filling the data entries with compressed data. The invalid data entries (and their corresponding metadata entries) together with the unused space in data entries with compressed data, collectively form "gaps" in the log segments. The LSA defragmentation control module 188 periodically performs a defragmentation process to consolidate such "gaps" into free storage space within the log segments that can be used to store new data.

Figure 3:
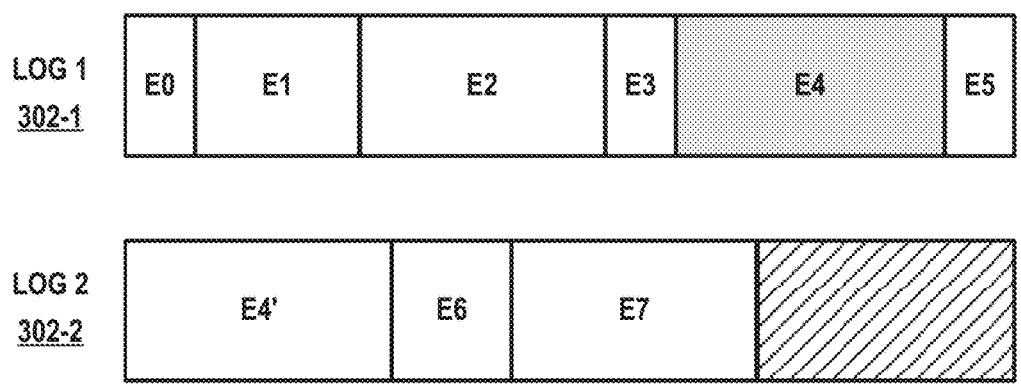
FIG. 3 schematically illustrates a log-structured array comprising multiple log segments, and a conventional data placement process for storing compressed data in log entries of the log segments.

In a conventional compression-enabled storage system which utilizes an LSA storage architecture to store compressed data, whenever a user-offset is written, the compressed data is placed into a log segment that has enough vacancy to host the compressed data. In particular, the new data is placed into a new log entry that is appended to the last log entry of the log segment. For example, FIG. 3 schematically illustrates a log-structured array comprising multiple log segments, and a conventional process for storing compressed data into log entries of the log segments. In particular, FIG. 3 illustrates a log-structured array 300 comprising a plurality of log segments (or logs) including a first log segment 302-1 (LOG 1) and a second log segment 302-2 (LOG 2), wherein each log segment 302-1 and 302-2 comprises a plurality of log data entries, generally denoted E(i).

In particular, the first log segment 302-1 comprises log data entries E0, E1, E2, E3, E4, and E5, and the second log segment 302-2 comprises log data entries E4', E6, and E7. The log data entries E(i) are shown to have variable sizes as the log data entries store compressed data. For ease of illustration, the metadata descriptors of the log data entries are not shown. The shaded region of the first log segment 302-1 represents a region with invalid (stale) data, and the striped region within the second log segment 302-2 represents a "logically" vacant region (e.g., logical data blocks that are vacant and can be used to store new data entries). FIG. 3 illustrates a state in which the compressed data of the log data entry E4 in the first log segment 302-1 has been updated and rewritten into the second log segment 302-2 as log entry E4'. In this instance, the log data entry E4 is no longer valid, thus resulting in a "gap" in the first log segment 302-1.

In a conventional LSA storage system which stores compressed data, whenever a user-offset is rewritten (e.g., the log entry E4 of the first log segment 302-1 is rewritten to the new log entry E4' in the second log segment 302-2), no effort is made to fit the new data into the location (log entry) of the older data. Instead, an out-of-place write is performed to store the updated/modified data in the next available log that has sufficient vacancy to hold the new data, similar to a new write. This allows the LSA storage system to accommodate the size-change variability of compressed data since data is not allocated to a fixed storage location. As noted above, due to the continued creation of invalid log entries over time, the LSA layout requires maintenance defragmentation cycles to close "gaps" in the storage space which result from the invalid entries.

A defragmentation process involves rewriting a large portion of a log segment, or the entire log segment, after packing the valid log data entries together, such that all gaps in the log segment are closed, and all vacant regions of the log segment become contiguous. The implementation of the LSA layout, together with the necessity to have defragmentation cycles, imposes new challenges with regard to certain types of storage media in which write amplification enhances the gradual wearing the storage devices, ultimately rendering the devices unusable. This is the case with SSD storage media, which are becoming increasingly popular because of their superior access times as compared to magnetic disks. The write operations involved in the defragmentation cycles, where the same data is rewritten just for the sole purpose of maintenance, constitutes undesirable write amplification.

In accordance with embodiments of the disclosure, the LSA control system 180 is configured to implement an efficient data placement process and defragmentation process which minimizes the amount of gaps that are formed in log segments when writing data to the log entries and which reduces the need to relocate valid data of log entries during defragmentation, thereby reducing the effects of write amplification. The data placement process implemented by the LSA control system 180 is based, in part, on the understanding that not all data is compressible. For example, when data compression is performed on incompressible data, the size of the resulting "compressed" data may be the same or greater than the size of the original, non-compressed data. As noted above, certain types of data such as pre-compressed content (e.g., compressed audio or compressed video), or pure random data, for example, are not effectively compressible.

Moreover, the data placement process implemented by the LSA control system 180 is based, in part, on the understanding that even if data is compressible to some degree, the level of data compression that is achieved for a given data block may be minimal (e.g., the level of data compression achieved does not meet a desired minimum threshold level of data compression). In this instance, while there is some benefit with regard to the savings in storage space that is achieved by storing compressed data with a minimal level of data compression, the space savings benefit in this circumstance is outweighed by the disadvantages associated with (i) the computational overhead associated with inline data compression/decompression, and (ii) the overhead and I/O amplification (e.g., write amplification) associated with performing out-of-place writes, and performing defragmentation to reclaim invalid data resulting from the out-of-place writes and unused storage space within log data entries which is not filled with compressed data.

As explained in further detail below, when the LSA control system 180 receives an I/O write request to write some block of data to LSA storage which is deemed to be "incompressible" (i.e., a minimal predefined threshold level of data compression cannot be obtained for the I/O write data), the LSA data placement management module 186 will store the I/O write data in its original non-compressed form for several reasons. For example, storing the I/O write data in its original non-compressed form avoids storing excess data in instances where the data compression yields compressed data with a compressed data size that is greater than the original data size. In addition, storing such incompressible I/O write data in its original form eliminates the computational processes and resources needed to decompress the data when read from storage. In addition, as explained in further detail below, the storage of non-compressed data allows for in-place updates of rewritten data (which minimizes the amount of invalid entries in the log segments, and thus reduces fragmentation) and reduces the I/O amplification associated with defragmentation cycles as valid data entries with non-compressed data are not relocated during a defragmentation process.

In this regard, the LSA control system 180 is configured to store both compressed and non-compressed data entries in log segments of the log-structured arrays 192 of a compression-enabled LSA storage system in a way that minimizes I/O amplification (e.g., write amplification) and enhances overall data access and management efficiency. In accordance with exemplary embodiments of the disclosure, techniques that are implemented by the LSA control system 180 for managing an LSA storage architecture are based, in part, on the implementation of (i) fixed-size data entries, (ii) a determination of compressibility of data to be stored in log entries of the LSA storage, and (iii) an alignment of log data entries to allocation units (e.g., logical block, pages, etc.) of the storage media.

More specifically, with regard to fixed-sized data entries, the data entries in a log segment correspond to blocks of data that are written to storage by a user. In some embodiments, the LSA control system 180 is configured to support the writing and reading of blocks of data that are integer multiples of some predefined log entry size (denoted LogEntrySize). For example, if the LogEntrySize is set to be 4 KB, then all I/O requests (e.g., writes and reads) will refer to a data block whose size is i×4 KB, where i∈ $\mathbb{N}$, where $\mathbb{N}$ denotes the set of natural numbers; i.e. $\{1,2,3, \ldots\}$.

Without loss of generality, compliance with the data entry size requirement can be achieved regardless of the value of LogEntrySize by noting that: I/O_Size=m×LogEntrySize+n, where m denotes a multiple of the log entry size, and where n is the remainder of the division into LogEntrySize chunks, and is given by: n=I/O_Size modulo LogEntrySize. For reads, the remainder n, if any, is zero-padded to yield m+1 chunks of equal size. For writes, n bytes need to be read from the medium to complement the last chunk.

With regard to data compressibility, the LSA data placement management module 186 will store I/O write data in either (i) compressed form when the compressibility determination module 174 indicates the I/O write data is "compressible," or (ii) in its originally received form (non-compressed form) when the compressibility determination module 174 indicates the I/O write data is deemed "incompressible." As noted above, in some embodiments, the compressibility of I/O write data is determined by (i) computing a "compressibility value" as a function of a size of the I/O write data and a size of the compressed I/O write data, and (ii) comparing the computed "compressibility value" to a predefined "compressibility threshold value" to determine whether a level of data compression of the compressed I/O write data meets or exceeds a target minimum level of data compression.

With regard to the alignment of the log entries to the native storage units of the storage media, it is understood that the storage space of all storage devices is organized into fixed-size addressable storage units (referred to as allocation units). For example, for SSDs, the smallest addressable storage unit is a "page," which is composed of several memory cells (common page sizes are 2 KB, 4 KB, 8 KB, or 16 KB). The pages of an SSD are aggregated into blocks, with 128 to 256 pages per block. For HDDs, the smallest addressable storage unit is a "logical data block" which is uniquely addressed using a corresponding logical block address (LBA). In HDDs, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4096 bytes.

Irrespective of the size of the native storage units, in some embodiments, the LogEntrySize of the LSA layout is configured to be aligned to the storage unit size (denoted DeviceUnitSize). More specifically, the LogEntrySize can be set equal to the DeviceUnitSize or the LogEntrySize can be a multiple of the DeviceUnitSize as follows:

LogEntrySize=$k$×DeviceUnitSize, where $k \in \mathbb{N}$.

For some implementations, however, the DeviceUnitSize could be considered too large when, for example, a user's I/O write requests frequently write log data entries with sizes that are smaller than the DeviceUnitSize. In such implementations, the LogEntrySize could be set to a quotient of the DeviceUnitSize that is a power of 2 as follows:

LogEntrySize=$q_{entry}$×DeviceUnitSize, where
$q_{entry}=2^k$: $k \in \mathbb{Z}$ where $\mathbb{Z}$ denotes the set of integers ( . . . , −2, −1, 0, 1, 2, . . . }. In this instance, since the DeviceUnitSize is always a power of 2, the above yields a LogEntrySize that is also a power of 2, which is common practice in storage systems.

To reiterate, the DeviceUnitSize corresponds to an "allocation unit size" or "cluster size" which is defined by the file system or operating system kernel when formatting a storage device. An allocation unit represents the smallest logical block size of storage space that can be used to hold data and which is addressed as one logical unit by the operating system, wherein each logical block has the same "allocation unit size" which corresponds to a specific number of bytes of physical disk space. It is to be noted that terms such as "device unit," "logical storage unit," "logical data block," and "allocation unit" mean the same thing and are used interchangeably in this disclosure.

The LSA management techniques according to the exemplary embodiments as described herein exploit unique characteristics of aligned non-compressed data entries. In particular, when the LogEntrySize is aligned with the DeviceUnitSize, it is trivial to populate log segments with non-compressed data entries in a manner that preserves such alignment. There are several unique traits resulting from this.

For example, when $q_{entry} \geq 1$, the writing of data entries consists of writing entire allocation units. As such, there is no need to perform a "read-modify-write" operation in order to maintain the contents of the portion of the allocation unit that is not being written. Typically, when accessing data for the purpose of modifying or deleting data within a given allocation unit, one may declare a read-modify-write cycle at the time that the data is recorded, as this obtains write locks (instead of a read locks) at the time of the read. This process prevents deadlocks by preventing another I/O request from acquiring a read lock on the same data entry while the read-modify-write cycle is in progress. On the other hand, when $q_{entry}<1$, "read-modify-write" operations are needed, but the following additional traits still apply.

Moreover, another unique trait is that for any value of $q_{entry}$, the reading of log data entries consists of reading entire device storage units, which typically results in optimal device performance. Another unique trait is that the size of the non-compressed log data entries is predicable because the size of each non-compressed data entry is fixed and predefined. Thus, the task of fitting such log data entries into log segments becomes trivial. Moreover, the metadata that describes such log data entries does not need to specify the size of the data entries, rather, the metadata merely needs to indicate that the data is non-compressed data. This translates into less storage space that is needed for the metadata, as the metadata descriptors are smaller in size.

The LSA management techniques according to the exemplary embodiments as described herein provide a reduction in write amplification as compared to conventional methods as discussed above in conjunction with FIG. 3. In particular, whenever aligned non-compressed data entries are being rewritten, it is possible to avoid rewriting their entire host log. Indeed, this is due to the alignment between the DeviceUnitSize and the LogEntrySize, such that in-place updates can be performed by rewriting the allocation units that hold the log data entry. Accordingly, this yields a superior performance in terms of write amplification compared to the conventional method discussed above.

Expanding on this principle, whenever a given log segment undergoes defragmentation, the log data entries in the given log segment, which have valid non-compressed data, are not read and rewritten to another location in the given log segment or another log segment. Instead, the valid, non-compressed log data entries remain in place, while other log data entries, with valid compressed data, are read and rewritten to new locations to defragment the log segments. Furthermore, in some implementations, the process of defragmenting logs involves potentially shifting the position of valid data entries within a given log, and thus the corresponding metadata descriptors must be updated to reflect the change. For these implementations, the ability to lock non-compressed log data entries in their position within the given log segment alleviates the need to update the metadata descriptors of non-compressed data entries upon defragmentation. This yields fewer overall writes to the disk (where the metadata is stored) and, thus, an overall increase in performance.

The above noted concepts and principles are implemented by the LSA control system 180 to generate and manage the layout of the log-structured arrays 192 in the storage devices 190. For example, in some embodiments, an LSA system is configured with a fixed LogEntrySize, with the fixed LogEntrySize being aligned to the DeviceUnitSize of the storage devices 190 which host the log-structured arrays 192. Furthermore, in some embodiments, it is preferred that $q_{entry} \geq 1$ is maintained. Moreover, with regard to metadata descriptors of the log data entries, without loss of generality, in addition to common metadata descriptors that can be generated by the LSA metadata generation module 182 and incorporated in metadata entries in the log segments, additional metadata descriptors can be utilized for log data entries to indicate whether the data in the given log entry includes compressed data or non-compressed data.

For example, the metadata descriptors for a given log entry can include a 1-bit flag which is either (i) set to logic "1" to indicate that the corresponding data is compressed or (ii) set to logic "0" to indicate that the corresponding data is non-compressed. In other embodiments, a metadata descriptor can record the size of the data within a given log entry, wherein the data size of the log entry provides an indication as to whether or not the data is compressed data. For example, if the metadata descriptor records the data size of the log entry, then any log data entry whose size is equal to a $q_{entry}$×DeviceUnitSize is deemed to be non-compressed data.

Furthermore, the LSA control system 180 is configured to implement log-structured arrays with log segments that host both compressed and non-compressed data. The non-compressed data entries within a given log segment are write-aligned to logical data blocks (e.g., allocation units) of the set of contiguous logical data blocks that make up the log segment. This write-alignment is maintained even at the cost of creating a gap of unused space in the log segment between the end of the last compressed data entry and the beginning of the next non-compressed data entry. Once placed in the log, a non-compressed data entry is never relocated within the log, even during defragmentation cycles. In this regard, defragmentation cycles will skip non-compressed data entries altogether. In addition, a non-compressed data entry is preferable re-written in-place of the corresponding older data (i.e., in the same log entry). When purged, a non-compressed data entry leaves a gap which can be re-populated with either compressed or non-compressed entries, e.g. during defragmentation cycles.

Moreover, in some embodiments, an LSA storage system is configured to split compressed data entries into at most p non-contiguous portions, p≥2, if such portions are separated by a sequence of one or more non-compressed data entries. The value of p impacts the size and complexity of the metadata required to describe such log entries, and the complexity of effort invested in reading such log entries. Accordingly, in some embodiments, an LSA storage system is configured to set the parameter p=2. To decrease the chances of having to split compressed data entries, in some embodiments, an LSA storage system is configured to write non-compressed data entries into a log segment at the end of the log segment (e.g., highest vacant offset in the log segment). In this instance, when compressed data entries are populated into the log segment, the compressed data entries tend to be placed adjacent to other compressed data entries at the head of the log segment. In other embodiments, non-compressed data entries can be written to any suitable offset in a given log segment, as placement at the end of the log segment is an optional configuration.

Figure 4:
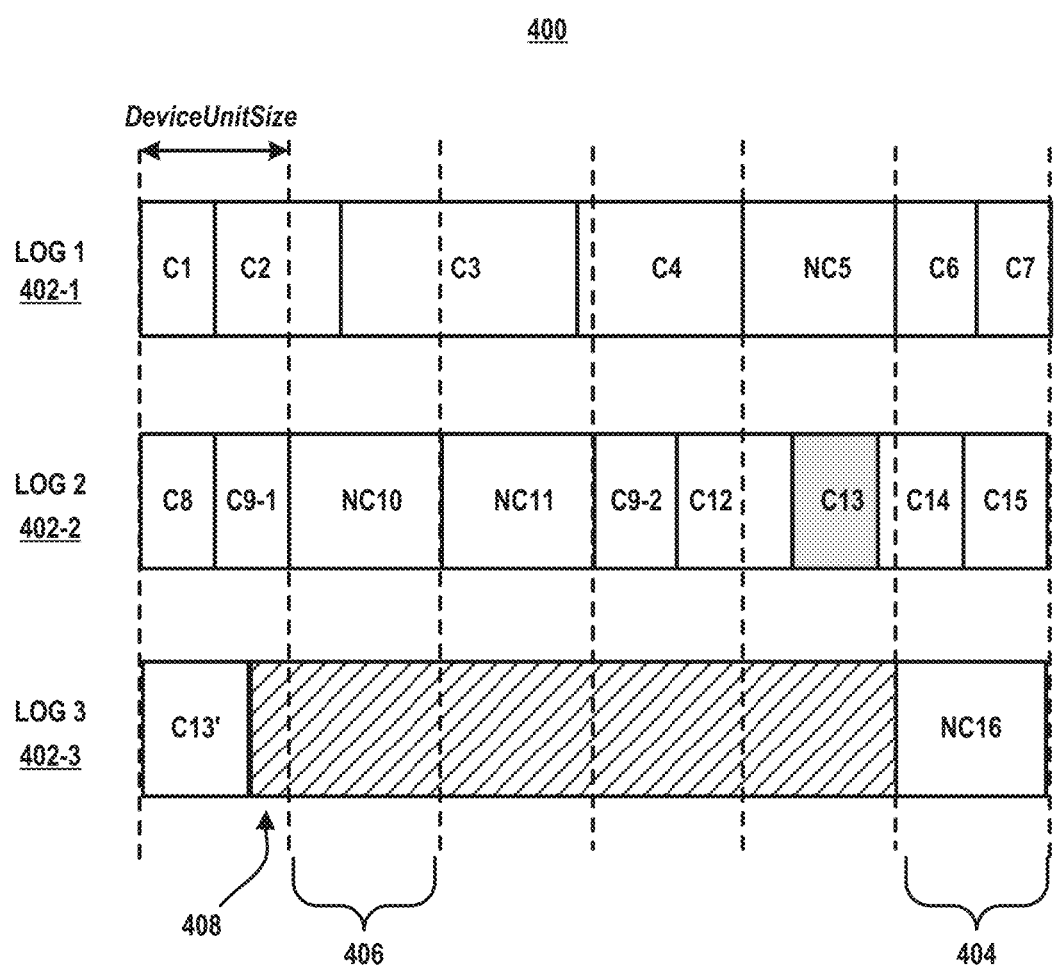
FIG. 4 schematically illustrates a log-structured array comprising multiple log segments, and a data placement process for storing compressed data and non-compressed data in log entries of the log segments, according to an exemplary embodiment of the disclosure.

FIG. 4 schematically illustrates a log-structured array comprising multiple log segments, and a data placement process for storing compressed data and non-compressed data in log entries of the log segments, according to an exemplary embodiment of the disclosure. In particular, FIG. 4 schematically illustrates a log-structured array 400 comprising a plurality of log segments including a first log segment 402-1 (LOG 1), a second log segment 402-2 (LOG 2) and a third log segment 402-3 (LOG 3), each comprising a plurality of data entries of compressed data or non-compressed data. The log data entries within the log segments 402-1, 402-2, and 402-3 which comprise compressed data are generally denoted C(i) and the log data entries which comprise non-compressed data are generally denoted NC(i). The log entries for metadata descriptors are omitted for clarity and ease of discussion. The dashed lines in FIG. 4 represent boundaries between the contiguous allocation units (based on DeviceUnitSize) that make up the log segments. Further, FIG. 4 illustrates an exemplary embodiment in which $q_{entry}=1$ and p=2.

The first log segment 402-1 comprises a plurality of compressed data entries C1, C2, C3, C4, C6, and C7, and a non-compressed data entry NC5. The non-compressed data entry NC5 has a size that is equal to the DeviceUnitSize. The second log segment 402-2 comprises non-compressed data entries NC10 and NC11 which have sizes that are equal to the DeviceUnitSize. The second log segment 402-2 includes a compressed data entry C9 that is split into two blocks, denoted C9-1 and C9-2. The two blocks, denoted C9-1 and C9-2 are non-contiguous portions of the compressed data entry C9, which are separated by at least one non-compressed data entry, which enables more efficient packing of the second log segment 402-2.

As further shown in FIG. 4, the second log segment 402-2 comprises a compressed data entry C13 that was originally written into the second log segment 402-2, and then subsequently rewritten into the third log segment 402-3 as a compressed data entry C13'. In this instance, the rewriting of data entry C13 into the third log segment 402-3 as a compressed data entry C13' leaves a gap of invalid data in the second log segment 402-2, which is represented by the shaded region for entry C13.

FIG. 4 further illustrates that the third log segment 402-3 comprises a non-compressed data entry NC16 that is allocated from an end portion (highest available offset) of the third log segment 402-3 such that the non-compressed data entry NC16 is write-aligned to a whole logical storage unit 404. The diagonal striped region in the third log segment 402-3 represents vacant storage space that can be used to store new data entries. As noted above, this data placement method increases the efficiency of sequentially populating the head of the third log segment 402-3 with compressed data entries such that the compressed data entries can be written into the third log segment 402-3 in a contiguous fashion starting from the head of the third log segment 402-3.

In an alternate embodiment, the non-compressed data entry NC16 could be written into the head of the third log segment 402-3 after the compressed data entry C13' in a way that the non-compressed entry NC16 is write-aligned to a next vacant logical storage unit 406 at the head of the third log segment 402-3 following the compressed data entry C13'. This would leave gap of unused space 408 in the third log segment 402-3 between the end of the compressed data entry C13' and the beginning of the non-compressed data entry write-aligned to the region of the logical storage unit 406.

FIG. 5 is a flow diagram of a method of writing data to a log-structured array according to an exemplary embodiment of the disclosure. For purposes of illustration, the process flow of FIG. 5 will be discussed in the context of the storage control system 150 of FIG. 1B. The storage control system 150 receives an I/O write request and associated I/O write data to be written to storage (block 500). The I/O write data is input to the data compression system 170 wherein the I/O write data is compressed by the data compression module 172 (block 501). The compressibility determination module 174 then proceeds to determine a level of data compression (i.e., compressibility) that is obtained for the I/O write data as a result of the data compression process (block 502). As noted above, in some embodiments, the level of data compression obtained for the I/O write data is determined by computing a compressibility value of the I/O write data based on a function of (i) a size of the I/O write data as received and (ii) a size of the compressed I/O write data (e.g., compression ratio), and comparing the computed compressibility value to a compressibility threshold value (e.g., compression ratio threshold value) to determine if the received data is compressible or not compressible. In effect, as noted above, this process allows the compressibility determination module 174 to determine whether or not a target threshold level of data compression has been obtained for the I/O write data.

If the target threshold level of data compression has been obtained for the I/O write data (affirmative determination in block 503), the LSA data placement management module 186 will proceed to store the compressed I/O write data in one or more log entries appended to the head of a log segment within the log-structured array which has available space (block 504). In addition, the LSA data placement management module 186 will append one or more metadata entries to the log segment to provide indexing information and other descriptive information associated with the one or more newly written log entries for the compressed I/O data (as well as other types of metadata such as checksum for error detection, etc.). In addition, if the newly added log entries comprise out-of-place updates of older data stored in previously written log entries, the metadata entries of the previously written log entries are updated with information to indicate that the previous log entries comprise invalid data.

On the other hand, if the target threshold level of data compression has not been obtained for the I/O write data (negative determination in block 503), the LSA data placement management module 186 will proceed to store the originally received I/O write data (without compression) in one or more log entries of a log segment with available space, such that each log entry which stores the received I/O write data without compression is write-aligned to at least one logical data block (i.e., allocation unit) of the set of contiguous logical data blocks of the log segment (block 505). In addition, the LSA data placement management module 186 will append one or more metadata entries to the log segment to provide indexing information and other descriptive information associated with the one or more newly written log data entries. It is to be noted that if the I/O write data comprises an update of non-compressed data stored in one or more previously written log data entries which are aligned to allocation units, the LSA data placement management module 186 will perform an in-place-update to rewrite previous log entries with the updated I/O write data.

FIG. 6 schematically illustrates a process for defragmenting a log segment according to an exemplary embodiment of the disclosure. In particular, FIG. 6 schematically illustrates a defragmentation process 600 for defragmenting the first log segment 402-1 of the log-structured array 400 (FIG. 4), which comprises the compressed data entries C1, C2, C3, C4, C6, and C7, and the non-compressed data entry NC5. As noted above, the non-compressed data entry NC5 is write-aligned to the DeviceUnitSize (i.e., aligned to an allocation unit). FIG. 6 illustrates a state of the first log segment 402-1 in which the compressed data entries C2, C3 and C4 are deemed invalid (denoted by shaded blocks) due to either the data being deleted or invalidated by out-of-place writes to other log segments (not shown).

FIG. 6 further illustrates a state of a defragmented log 602-1 (LOG1') which is generated as a result of the defragmentation process 600 applied to the first log segment 402-1. In this process, all valid compressed data entries C1, C6 and C7 are read from the first log segment 402-1 for relocation, while the non-compressed data entry NC5 is not read out or otherwise relocated as part of the defragmentation process. As part of the defragmentation process, the physical storage blocks associated with the first log segment 402-1 are reclaimed for reuse, except for the logical block associated with, and aligned to, the non-compressed data entry NC5. The valid compressed data blocks C1, C6, and C7 are then packed into new data entries at the head of the defragmented log segment 602-1 (LOG 1'), while the non-compressed data entry NC5 remains in the same data entry location. The diagonal striped regions in the defragmented log segment 602-1 represent reclaimed storage space that is ready for reuse. The defragmentation process 600 reduces the I/O amplification by avoiding the need to read and rewrite the non-compressed data entry NC5 to a new location during the defragmentation process.

Figure 7:
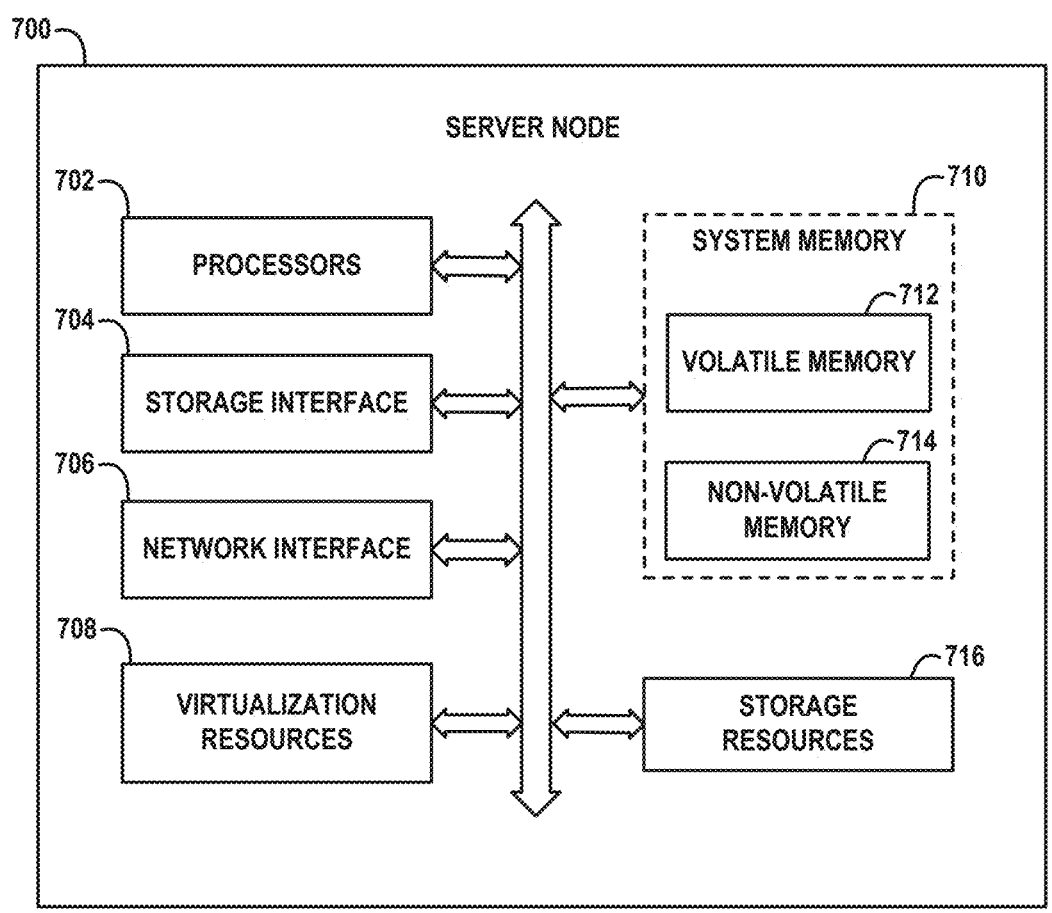
FIG. 7 schematically illustrates a framework of a server node for implementing a storage node which hosts a log-structured storage control system according to an exemplary embodiment of the disclosure.

FIG. 7 schematically illustrates a framework of a server node (e.g., the storage node(s) 140, FIGS. 1A and 1B) which can be implemented for hosting a storage control system (e.g., the storage control system 150, FIG. 1B), according to an exemplary embodiment of the disclosure. The server node 700 comprises processors 702, storage interface circuitry 704, network interface circuitry 706, virtualization resources 708, system memory 710, and storage resources 716. The system memory 710 comprises volatile memory 712 and non-volatile memory 714.

The processors 702 comprise one or more types of hardware processors that are configured to process program instructions and data to execute a native operating system (OS) and applications that run on the server node 700. For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 706 enables the server node 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more services or functions which are hosted by the server node 700. For example, the virtualization resources 708 can be configured to implement the various modules and functionalities of the storage control system 150 as shown in FIG. 1B as discussed herein. In one embodiment, the virtualization resources 708 comprise virtual machines that are implemented using a hypervisor platform which executes on the server node 700, wherein one or more virtual machines can be instantiated to execute functions of the server node 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 700 as well execute one or more of the various modules and functionalities of the storage control system 150 of FIG. 1B as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components, systems, and modules of the storage control system 150 comprise program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of NAND Flash storage devices, SSD devices, or other types of next generation non-volatile memory (NGNVM) devices. The system memory 710 can be implemented using a hierarchical memory tier structure wherein the volatile system memory 712 is configured as the highest-level memory tier, and the non-volatile system memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the server node 700, and to temporarily store data that is utilized and/or generated by the native OS and application programs and processes running on the server node 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
  implementing, by a storage control system, a log-structured array in at least one block storage device, wherein the at least one block storage device comprises a physical storage space divided into a plurality of logical data blocks, wherein the logical data blocks each comprise a separately addressable unit of the physical storage space with a specified block size, and wherein the log-structured array comprises at least one log segment which comprises a set of contiguous logical data blocks of the physical storage space of the at least one block storage device;
  receiving, by the storage control system, an input/output (I/O) write request and associated I/O write data to be written to the at least one block storage device;
  compressing, by the storage control system, the I/O write data to generate compressed I/O write data;
  determining, by the storage control system, a level of data compression of the compressed I/O write data;
  determining, by the storage control system, whether the level of data compression of the compressed I/O write data meets a target threshold level of data compression;

in response to determining that the level of data compression of the compressed I/O write data does meet the target threshold level of data compression, the storage control system writing the compressed I/O write data in a log entry in the at least one log segment of the log-structured array, wherein the log entry which comprises the compressed I/O write data is unaligned to at least one logical data block of the set of contiguous logical data blocks of the at least one log segment; and in response to determining that the level of data compression of the compressed I/O write data does not meet the target threshold level of data compression, the storage control system writing the I/O write data without compression in a log entry in the at least one log segment of the log-structured array, wherein the log entry which comprises the I/O write data without compression is write-aligned to at least one logical data block of the set of contiguous logical data blocks of the at least one log segment.

2. The method of claim 1, wherein determining the level of data compression of the compressed I/O write data comprises the storage control system determining a compressibility value as a function of a size of the I/O write data as received and a size of the compressed I/O write data; and wherein determining whether the level of data compression of the compressed I/O write data meets the target threshold level of data compression comprises the data control system comparing the determined compressibility value to a predefined compressibility threshold value.

3. The method of claim 2, wherein the compressibility value is computed as a compression ratio and wherein the compressibility threshold value comprises a compression ratio threshold value.

4. The method of claim 1, wherein writing the I/O write data without compression in the log entry in the at least one log segment of the log-structured array comprises the storage control system writing the I/O write data without compression in a next available log entry location at a head of the at least one log segment, which is write-aligned to a logical data block of the set of contiguous logical data blocks of the at least one log segment.

5. The method of claim 1, wherein writing the I/O write data without compression in the log entry in the at least one log segment of the log-structured array comprises the storage control system writing the I/O write data without compression in a next available log entry location from an end of the at least one log segment, which is write-aligned to a logical data block of the set of contiguous logical data blocks of the at least one log segment.

6. The method of claim 1, wherein writing the I/O write data without compression in the log entry in the at least one log segment of the log-structured array comprises the storage control system performing an in-place-update by rewriting the I/O write data without compression in an existing log entry of the at least one log segment which comprises a previous version of the I/O write data.

7. The method of claim 1, wherein writing the compressed I/O write data in the log entry in the at least one log segment of the log-structured array comprises:

writing a first portion of the compressed I/O write data in a first log entry; and writing a second portion of the compressed I/O write data in a second log entry;

wherein the first log entry and the second log entry are separated by at least a third log entry which comprises non-compressed data and which is write-aligned to at least one logical data block of the set of contiguous logical data blocks of the at least one log segment.

8. The method of claim 1, further comprising performing, by the storage control system, a defragmentation process to defragment the at least one log segment of the log-structured array without relocating any log entry in the at least one log segment which comprises valid non-compressed data and which is write-aligned to at least one logical data block of the set of contiguous logical data blocks of the at least one log segment.

9. An article of manufacture comprising a non-transitory processor-readable storage medium having stored therein program code of one or more software programs, wherein the program code is executable by one or more processors to implement a method comprising:

implementing, by a storage control system, a log-structured array in at least one block storage device, wherein the at least one block storage device comprises a physical storage space divided into a plurality of logical data blocks, wherein the logical data blocks each comprise a separately addressable unit of the physical storage space with a specified block size, and wherein the log-structured array comprises at least one log segment which comprises a set of contiguous logical data blocks of the physical storage space of the at least one block storage device;

receiving, by the storage control system, an input/output (I/O) write request and associated I/O write data to be written to the at least one block storage device;

compressing, by the storage control system, the I/O write data to generate compressed I/O write data;

determining, by the storage control system, a level of data compression of the compressed I/O write data;

determining, by the storage control system, whether the level of data compression of the compressed I/O write data meets a target threshold level of data compression;

in response to determining that the level of data compression of the compressed I/O write data does meet the target threshold level of data compression, the storage control system writing the compressed I/O write data in a log entry in the at least one log segment of the log-structured array, wherein the log entry which comprises the compressed I/O write data is unaligned to at least one logical data block of the set of contiguous logical data blocks of the at least one log segment; and in response to determining that the level of data compression of the compressed I/O write data does not meet the target threshold level of data compression, the storage control system writing the I/O write data without compression in a log entry in the at least one log segment of the log-structured array, wherein such that the log entry which comprises the I/O write data without compression is write-aligned to at least one logical data block of the set of contiguous logical data blocks of the at least one log segment.

10. The article of manufacture of claim 9, wherein:

the program code for determining the level of data compression of the compressed I/O write data comprises program code that is executable by the one or more processors for determining a compressibility value as a function of a size of the I/O write data as received and a size of the compressed I/O write data; and the program code for determining whether the level of data compression of the compressed I/O write data meets the target threshold level of data compression comprises program code that is executable by the one or more processors for comparing the determined compressibility value to a predefined compressibility threshold value.

11. The article of manufacture of claim 10, wherein the compressibility value is computed as a compression ratio and wherein the compressibility threshold value comprises a compression ratio threshold value.

12. The article of manufacture of claim 9, wherein the program code for writing the I/O write data without compression in the log entry in the at least one log segment of the log-structured array comprises program code that is executable by the one or more processors for writing the I/O write data without compression in one of (i) a next available log entry location at a head of the at least one log segment, which is write-aligned to a logical data block of the set of contiguous logical data blocks of the at least one log segment and (ii) a next available log entry location from an end of the at least one log segment, which is write-aligned to a logical data block of the set of contiguous logical data blocks of the at least one log segment.

13. The article of manufacture of claim 9, wherein the program code for writing the I/O write data without compression in the log entry in the at least one log segment of the log-structured array comprises program code that is executable by the one or more processors for performing an in-place-update by rewriting the I/O write data without compression in an existing log entry of the at least one log segment which comprises a previous version of the I/O write data.

14. The article of manufacture of claim 9, wherein the program code for writing the compressed I/O data in a log entry in the at least one log segment of the log-structured array comprises program code that is executable by the one or more processors for:
writing a first portion of the compressed I/O write data in a first log entry; and
writing a second portion of the compressed I/O write data in a second log entry;
wherein the first log entry and the second log entry are separated by at least a third log entry which comprises non-compressed data and which is write-aligned to at least one logical data block of the set of contiguous logical data blocks of the at least one log segment.

15. The article of manufacture of claim 9, further comprising program code that is executable by the one or more processors for performing, by the storage control system, a defragmentation process to defragment the at least one log segment of the log-structured array without relocating any log entry in the at least one log segment which comprises valid non-compressed data and which is write-aligned to at least one logical data block of the set of contiguous logical data blocks of the at least one log segment.

16. A server node, comprising:
at least one processor; and
system memory configured to store program code, wherein the program code is executable by the at least one processor to implement a storage control system which is configured to:
implement a log-structured array in at least one block storage device, wherein the at least one block storage device comprises a physical storage space divided into a plurality of logical data blocks, wherein the logical data blocks each comprise a separately addressable unit of the physical storage space with a specified block size, and wherein the log-structured array comprises at least one log segment which comprises a set of contiguous logical data blocks of the physical storage space of the at least one block storage device;
receive an input/output (I/O) write request and associated I/O write data to be written to the at least one block storage device;
compress the I/O write data to generate compressed I/O write data;
determine a level of data compression of the compressed I/O write data;
determine whether the level of data compression of the compressed I/O write data meets a target threshold level of data compression;
write the compressed I/O write data in a log entry in the at least one log segment of the log-structured array, in response to determining that the level of data compression of the compressed I/O write data does meet the target threshold level of data compression, wherein the log entry which comprises the compressed I/O write data is unaligned to at least one logical data block of the set of contiguous logical data blocks of the at least one log segment; and
write the I/O write data without compression in a log entry in the at least one log segment of the log-structured array, wherein the log entry which comprises the I/O write data without compression is write-aligned to at least one logical data block of the set of contiguous logical data blocks of the at least one log segment, in response to determining that the level of data compression of the compressed I/O write data does not meet the target threshold level of data compression.

17. The server node of claim 16, wherein:
in determining the level of data compression of the compressed I/O write data, the storage control system is configured to determine a compressibility value as a function of a size of the I/O write data as received and a size of the compressed I/O write data; and
in determining whether the level of data compression of the compressed I/O write data meets the target threshold level of data compression, the storage control system is configured to compare the determined compressibility value to a predefined compressibility threshold value.

18. The server node of claim 16, wherein in writing the I/O write data without compression in the log entry in the at least one log segment of the log-structured array, the storage control system is configured to write the I/O write data without compression in one of (i) a next available log entry location at a head of the at least one log segment, which is write-aligned to a logical data block of the set of contiguous logical data blocks of the at least one log segment and (ii) a next available log entry location from an end of the at least one log segment, which is write-aligned to a logical data block of the set of contiguous logical data blocks of the at least one log segment.

19. The server node of claim 16, wherein:
in writing the I/O write data without compression in the log entry in the at least one log segment of the log-structured array, the storage control system is configured to perform an in-place-update by rewriting the I/O write data without compression in an existing log entry of the at least one log segment which comprises a previous version of the I/O write data; and
in writing the compressed I/O write data in the log entry in the at least one log segment of the log-structured array, the storage control system is configured to:
write a first portion of the compressed I/O write data in a first log entry; and write a second portion of the compressed I/O write data in a second log entry;

wherein the first log entry and the second log entry are separated by at least a third log entry which comprises non-compressed data and which is write-aligned to at least one logical data block of the set of contiguous logical data blocks of the at least one log segment.

20. The server node of claim 16, wherein the storage control system is configured to perform a defragmentation process to defragment the at least one log segment of the log-structured array without relocating any log entry in the at least one log segment which comprises valid non-compressed data and which is write-aligned to at least one logical data block of the set of contiguous logical data blocks of the at least one log segment.

* * * * *